United States Patent [19]
Netter

[11] 3,788,414
[45] Jan. 29, 1974

[54] SMALL VEHICLE LIFT
[76] Inventor: Felix P. Netter, 210-22nd Ave. N., Saint Cloud, Minn. 56301
[22] Filed: Aug. 18, 1972
[21] Appl. No.: 281,659

[52] U.S. Cl. ............................................. 187/8.71
[51] Int. Cl. ............................................. B60s 13/00
[58] Field of Search. 187/8.41, 8.71; 104/44; 212/8, 212/59

[56] References Cited
UNITED STATES PATENTS
2,135,765  11/1938  Paine ................................... 104/44
2,565,536  8/1951   Valentine .......................... 212/59 R
3,583,326  6/1971   Poissant .............................. 104/44

FOREIGN PATENTS OR APPLICATIONS
1,120,834  3/1955  France .............................. 187/8.71
1,124,654  3/1962  Germany .......................... 187/8.71

Primary Examiner—Richard A. Schacher
Attorney, Agent, or Firm—H. Dale Palmatier; James R. Haller

[57] ABSTRACT

A small vehicle lift having a swiveling base embedded beneath the floor, a cantilever lifting arm including parallel links attached to the base, a hydraulic jack lifting the outer end of the arm, a vehicle support rack swiveling about a supporting bracket attached to the outer end of the cantilever arm and maintained level by the parallel links, the rack being tiltable relative to the support bracket for loading and unloading vehicles, and being shiftable to various positions over the bracket to more nearly center the weight of the vehicle over the bracket.

9 Claims, 4 Drawing Figures

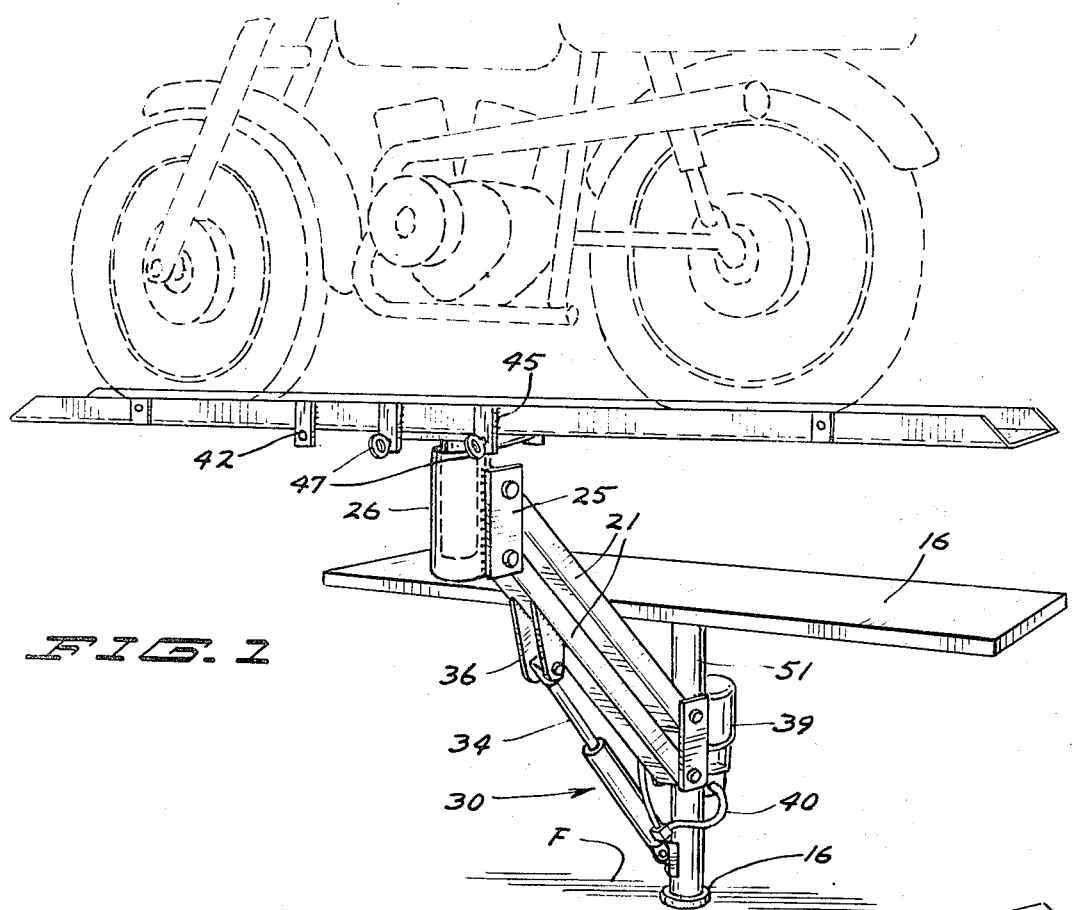
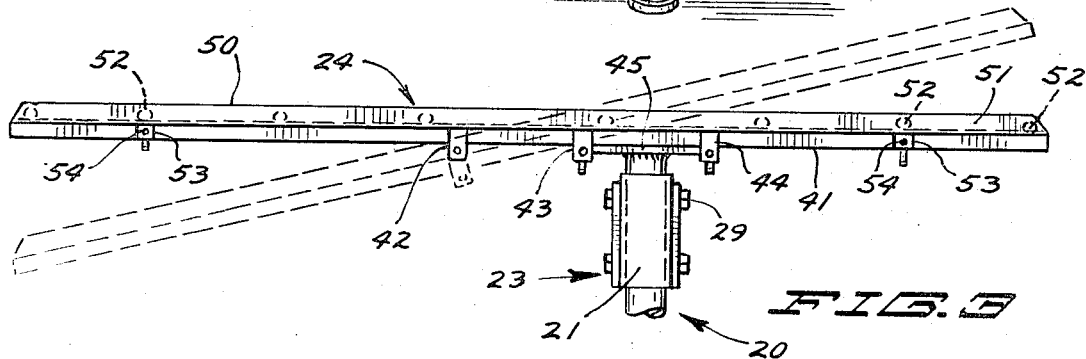
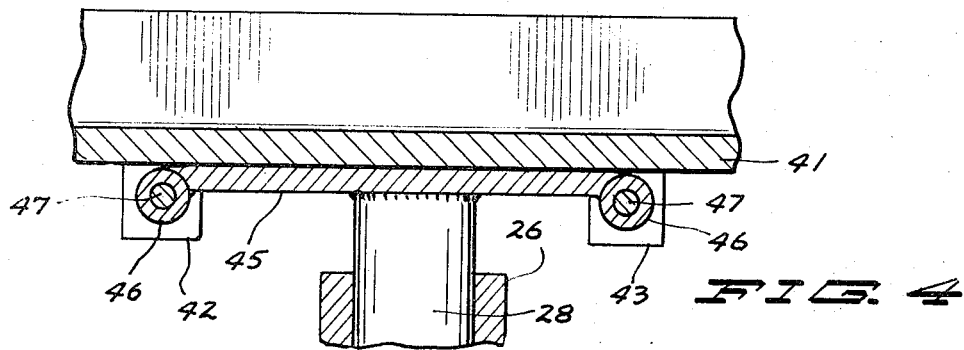

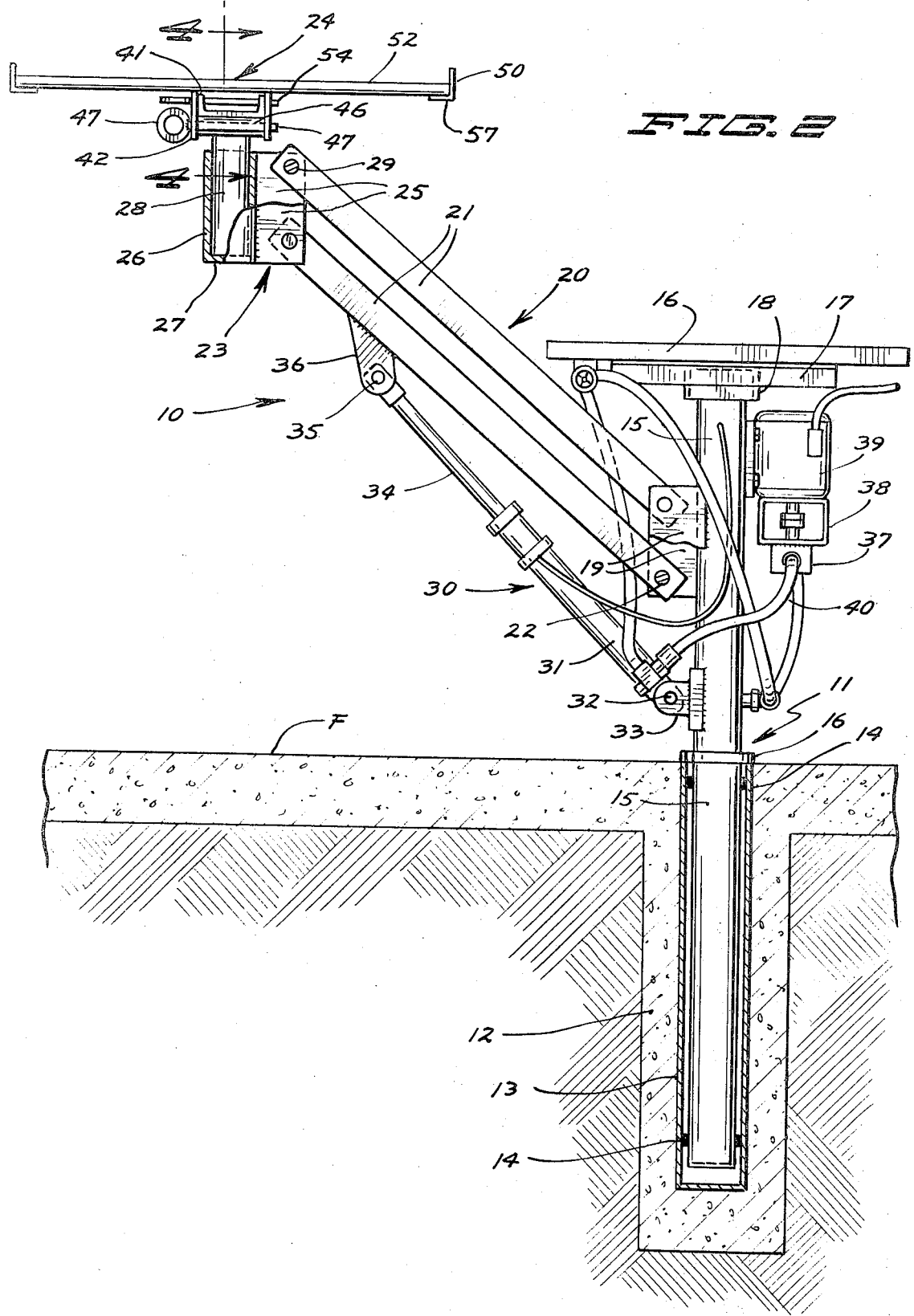

SMALL VEHICLE LIFT

BRIEF SUMMARY OF THE INVENTION

The small vehicle lift for motorcycles, motor bikes and snowmobiles has a swiveling base attached to or embedded in the floor, and a footing and a frame on the base above the floor level. The base frame mounts a work table directly above the swiveling base to turn with the base frame, and also mounts a vehicle support and lifting mechanism off to one side.

The vehicle is supported on a rack which is rotatably carried on a swivel bracket for revolving about an upright axis. The support bracket is connected to the base frame by a cantilever arm which includes a pair of parallel leveling links and a lifting jack which swings the cantilever arm upward and downward to raise and lower the vehicle.

The vehicle support rack includes an upwardly opening channel to confine the wheels of a motorcycle, and a removable rigid grid work frame sufficiently wide to support a snowmobile. The rack overlies the swivel bracket and is connected thereto in any of a number of positions by removable cross pins extended through aligned apertures in the bracket and rack. The rack may be shifted along the bracket to keep the center of the weight of the vehicle over the bracket; and the rack may also be tilted for easy loading and unloading of the vehicle. The open grid work of the removable frame permits obtaining access to all portions of the snowmobile carried on the rack.

BRIEF DESCRIPTION OF DRAWINGS

FIG. 1 is a perspective view of the vehicle lift and shown supporting a motorcycle.

FIG. 2 is an elevation view of the lift and its mounting and shown with the snowmobile supporting platform incorporated into the rack, and having portions of the mechanism broken away and shown in section for clarity of detail.

FIG. 3 is a detail side elevation view of the rack and illustrating the rack being shifted off center on the supporting bracket and also including a dotted line position showing the manner in which the rack may be tilted.

FIG. 4 is an enlarged detail section view taken approximately at 4—4 in FIG. 2 but with the snowmobile supporting platform removed.

DETAILED DESCRIPTION OF INVENTION

One form of the invention is shown in the drawings and is described herein. The small vehicle lift is indicated in general by numeral 10 and includes a floor-mounted base frame, indicated in general by numeral 11. The base frame includes a suitable footing 12 which is ordinarily embedded in the ground. The footing includes a steel sleeve 13 with annular bearings 14 affixed therein. A rotary column 15 of rigid steel pipe material is fitted within the bearings 14 to rotate therein, and has a rigid collar 16 welded to bear downwardly against the upper edge of the steel jacket 13 in the footing. The rotary column 15 of the base frame 11 extends above the level of floor F and has a work table 16 affixed to the upper end thereof. The table 16 has a table frame 17 which incorporates a sleeve which is affixed to the upper end of column 15 as by set screws.

A pair of upright and parallel bracket plates 19 are affixed by welding to the rigid steel column 15 for supporting the cantilever lift arm indicated in general by numeral 20. The cantilever lift arm includes a pair of rigid parallel links 21 constructed of rigid square tubing, and the inner ends of the links 21 are mounted on horizontal pivots 22 which protrude through aligned apertures in the links 21 and ears 19. The lift arm 20 may thereby swing in a vertical plane to raise and lower the outer end.

An upright mounting 23 is provided at the outer end of the cantilever lift arm 20 for carrying the vehicle support rack 24 in predetermined horizontal orientation in maintaining the horizontal orientation regardless of the vertical position of the rack, and also permitting the rack 24 to be rotated about a vertical axis with respect to the cantilever arm 20. The upright mounting 23 includes a pair of upright parallel rigid mounting plates 25 affixed as by welding to an upright rigid tubular sleeve 26 of steel and having a bottom closure plate 27 coperating with the sleeve 26 in defining a bearing for an upright rotary mounting post 28. The ears or mounting plates 25 and the outer ends of the links 21 have aligned apertures which receive the pivots 29 for connecting and maintaining the links 21 in vertically spaced relation and swingably connected to the upright mounting 23. Because of the parallel links 21 and pivotal connections with the upright mounting 23 and the column 15, the upright mounting and the bearing sleeve 26 and post 28 will maintain a precise vertical orientation regardless of the vertical position of the cantilever arm 20 and rack 24.

A hydraulic jack 30 is provided for raising and lowering the cantilever arm 20. The cylinder 31 of the jack is swingably mounted by pivot 32 to the apertured ears 33 which are affixed as by welding to the column 15. The piston rod 34 of the jack has its end connected by pivot 35 to apertured ears 36 on the lowermost of the links 21. It will be understood that by extending and retracting the piston rod 34, the cantilever arm and rack 24 will be raised and lowered.

Hydraulic fluid is supplied to the jack 30 from a pump 37 supported by bracket 38 and motor 39 from the central column 15. Hoses 40 interconnect the jack 30 with the pump and with the interior of the column 15 which serves as a reservoir for the hydraulic fluid. Suitable controls are provided for operating the pump, motor and jack 30 for raising the cantilever arm and rack 24, retaining the rack in predetermined position, and then allowing the rack and arm to be lowered as desired.

The rack includes an upwardly facing channel 41 which is sufficiently wide to receive the wheel of a motorcycle therein, and the channel 41 is sufficiently long so that all models of current motorcycles will be accommodated within the length of the channel 41. The channel 41 is provided with a plurality of depending apertured ears 42, 43 and 44 which are affixed as by welding to the sides of the channel and which are equally spaced from each other along the length of the channel. For mounting the channel 41 on the post 28, a frameplate 45 is affixed as by welding on the top of the post 28 and is provided with a pair of parallel rigid sleeves 46 at the opposite edges of the plate. The sleeves 46 are aligned with the apertures in a pair of the adjacent ears 42, 43 and 44 to receive removable mounting pins 47 which will secure the channel 41 rigidly to the rotary post 28 which is seated in the sleeve bearing 26.

It should be recognized that the equal spacing between the ears 42, 43 and 44 facilitates shifting of the channel 41 to alternate positions with respect to the post 28. In FIG. 4, it will be seen that the channel 41 is mounted to sleeves 46 at ears 42 and 43 so that the channel is substantially centered, lengthwise, over the post 28. In FIG. 3, the rack 24 and channel 41 is shown off center, longitudinally, with respect to the upright mounting 23, and, in this instance, the plate 45 is mounted between the adjacent ears 43 and 44. This off center mounting of the rack 24 in FIG. 3 is provided so that when a snowmobile is carried by the rack 24, the center weight of the snowmobile will be approximately above the upright mounting 23 and the cantilever arm 20. It will be noted that the weight of a snowmobile is not distributed symmetrically along its length, but the front of most snowmobiles is much heavier than the rear because the engine is at the front of a snowmobile.

The vehicle support rack 24 also includes a broad grid work platform 50 detachably mounted on the channel 41. The platform 50 includes a pair of rigid side frames 51 of angle iron, and a plurality of widely spaced rigid steel rods 52 to form the open grid work deck of the platform 50, upon which a snowmobile will be supported. The platform 50 has a plurality of apertured ears 53 depending from certain of the rigid cross bars 52 and lying along the sides of the channel 41. Removable pins 54 project through the aligned apertures in ears 53 and in the sides of the channel 41 for retaining the snowmobile platform 50 upon the channel 41. In the use and operation of the lift 10, the platform 50 will be applied to the channel 41 to be a part of the rack 24 if a snowmobile is to be serviced, but if a motorcycle is to be serviced, the broad platform 50 is removed by removing pins 54 and then lifting the platform off the channel 41.

When the vehicle is to be loaded onto the rack 24, the hydraulic controls are operated so that the jack 30 will be permitted to retract its piston and the cantilever arm 20 will be lowered until the upright mounting 23 engages the floor. One of the pins 47 will be removed so that the rack 20 may be tilted to the inclined position illustrated in FIG. 3 so that one end of the rack will be in close proximity with the floor surface, whereupon the vehicle may be easily run up onto the rack 24 to the desired position. When the vehicle is properly located on the rack 24, the rack will be oriented to horizontal position again and the pin 47 which was previously removed, will be replaced to retain the rack 24 in the horizontal position as illustrated in FIG. 3. The pump 37 is thereupon operated to extend the hydraulic jack 30, whereupon the cantilever arm is swung upwardly to raise the rack 24 off the floor until the vehicle is at a height comfortable for a workman to work on the parts that need servicing. In some instances, the rack 24 will be raised quite high, and in other instances the rack will be raised only to a small extent so that the part of the vehicle being worked upon will be comfortably presented in front of the workman.

While the rack 24 and cantilever arm 20 are in elevated position, the rack 24 may be revolved by simply turning the rack and post 28 within the bearing 26. This obviously facilitates working on both sides of the vehicle as is required in many servicing operations. The rack 24 and the vehicle supported thereon may be swung from one location to another by swinging the cantilever arm and the column 15 about the bearings 14 in the steel sleeve jacket 13 in the floor. This swinging of the arm 20 and the swinging of the rack and vehicle with the arm 20 facilitates the testing of certain portions of the vehicle being worked on and the use of certain servicing tools may be located within the vicinity of the servicing rack. The swinging of the arm 20 and the rack 24 about the column 15 also facilitates an efficient utilization of space within a shop and provides some variation to acommodate other work being done in adjacent areas.

The work table 16 will be used to carry service and analyzing equipment so that they are readily and easily available at the vehicle which is carried on the rack 24.

When servicing has been completed, the hydraulic controls are again operated to relieve the hydraulic fluid pressure in the cylinder of the jack so that the piston rod may retract and the arm 20 and rack 24 may be swung to floor level. One of the pins 47 may again be removed to facilitate tilting of the rack to the inclined position shown in FIG. 3 whereupon the vehicle may be readily and easily removed from the rack. The tilting obtained by removal of one of the pins 47 is obtainable regardless of whether the post 28 is centered between the ears 42 and 43, or whether the post is centered between the ears 43 and 44. Therefore this tilting function is obtainable for both motorcycles and snowmobiles.

It will be seen that I have provided a new and improved lift for small vehicles such as motorcycles and snowmobiles which facilitates presenting the vehicle at the position which is comfortable for the mechanic without stooping or stretching and facilitating swinging the vehicle around to service both sides from one stationary position where the mechanic will have his tools and work bench. The lfit incorporates a work table to carry analyzing and servicing equipment which are thereby presented in an orderly and convenient location.

I claim:

1. A servicing lift for small vehicles such as motorcycles and snowmobiles, comprising:
   a floor-mounted upright base frame pivotable about a vertical axis extending therethrough;
   a cantilever lift arm projecting from and swingably connected to the base frame, the lift arm including a pair of parallel links spaced vertically from each other and pivotally mounted on the base frame for vertical swinging;
   an upright mounting at the outer end of the arm and pivotally connected to the parallel links and held by the links in the same upright orientation at various lifted positions, the mounting being movable downward to a position adjacent the floor;
   an elongate support rack on the upright mounting and rotatably mounted thereon for movement about a vertical axis therethrough to underlie and support such a small vehicle, the rack being tiltable on the upright mounting to lower one end of the rack to the floor for loading and unloading of vehicles onto the rack, and releasable means restraining the rack against tilting; and
   means for raising and lowering the lift arm to raise and lower the rack.

2. The servicing lift for small vehicles according to claim 1 and including a horizontal pivot connecting the rack to the upright mounting and facilitating tilting of the rack, the rack and mounting having aligned apertures and a removable pin in the apertures and spaced from said pivot for releasably retaining the rack against tilting.

3. The servicing lift for small vehicles according to claim 2 and said horizontal pivot also comprising a removable pin extending through sligned apertures of the rack and mounting, and additional apertures in the rack to align with the apertures of the upright mounting when the rack is shifted and repositioned on the rack, thereby facilitating shifting the weight of the vehicle to a different position with respect to the upright mounting and lift arm.

4. The servicing lift for small vehicles according to claim 1 and the rack including an upwardly opening channel tiltably connected to the upright mounting for supporting a motorcycle, and the rack also including a broad platform overlying the channel and detachably connected thereto for supporting snowmobiles.

5. The servicing lift for small vehicles according to claim 4 and the snowmobile platform being an open rigid grid work having widely spaced rigid cross bars with open spaces therebetween providing access to all portions of the snowmobile.

6. The servicing for small vehicles according to claim 1 and said floor-mounted upright base frame including a support footing and a rotary connection between the footing and the lift arm facilitating turning of the lift arm and rack about an upright axis at the base frame.

7. The servicing lift for small vehicles according to claim 1 wherein said means for raising and lowering the lift arm to raise and lower the rack comprises a hydraulic jack connected between the lift arm and the upright base frame.

8. The servicing lift for smaller vehicles according to claim 1 including a work table carried on said floor-mounted upright base frame and rotatable therewith, whereby orientation between the work table and the support rack is maintained when the floor-mounted upright base frame is pivoted about its axis.

9. A servicing lift for small vehicles such as motorcycles and snowmobiles, comprising:

a floor-mounted base frame including a footing and an upright column rotatably mounted on the footing for movement about an upright axis;

a work table carried on the column and rotatable therewith;

a cantilever lift arm projecting from and connected to the column for vertical swinging, the lift arm including a pair of parallel links spaced vertically from each other and pivotally connected to the column for vertical swinging, bracket means at the outer end of the arm including a pair of vertically spaced pivots mounting the outer ends of said links, said bracket means including an upright bearing with a vertical axis maintained in vertical orientation regardless of the vertical position as the lift arm is swung upwardly and downwardly, said bracket means also including an upright rotary post in said bearing for rotation therein and a mounting plate overlying the post and affixed thereto, a pair of horizontal sleeves lying parallel to each other at opposite edges of said plate and affixed thereto;

an elongate support rack for supporting a vehicle and including a horizontal, upwardly facing channel overlying said plate and post and having apertured ears depending adjacent the opposite ends of said sleeves, a pair of removable pins inserted through the aligned apertures and sleeves to retain the rack on the plate and post and to permit tilting of the rack when one of the pins is removed, and an additional pair of apertured ears affixed on the channel for cooperation with the sleeves and pins in retaining the rack on the plate and post in an alternate position shifted endwise of the elongate rack; and said support rack also including a rigid open grid work platform substantially broader than said channel and overlying the channel for supporting a snowmobile, the rigid platform and the channel having aligned apertures and removable pins in said apertures for releasably retaining the platform on the channel as a part of the rack; and a hydraulic jack connected between the rigid column and one of the parallel links for raising and lowering the lift arm.

* * * * *

UNITED STATES PATENT OFFICE
CERTIFICATE OF CORRECTION

Patent No. 3,788,414        Dated January 29, 1974

Inventor(s) Felix P. Netter

It is certified that error appears in the above-identified patent and that said Letters Patent are hereby corrected as shown below:

Column 5, line 26, after "servicing", --lift-- should be inserted.

Signed and sealed this 21st day of May 1974.

(SEAL)
Attest:

EDWARD M. FLETCHER, JR.
Attesting Officer

C. MARSHALL DANN
Commissioner of Patents